United States Patent [19]

Waldschmidt et al.

[11] Patent Number: 5,322,331
[45] Date of Patent: Jun. 21, 1994

[54] HOSE COUPLING AND METHOD OF CONSTRUCTING SAME

[75] Inventors: William L. Waldschmidt, Farmington; Bruce E. McClellan, Richfield, both of Minn.

[73] Assignee: Thermo King Corporation, Minneapolis, Minn.

[21] Appl. No.: 96,231

[22] Filed: Jul. 26, 1993

[51] Int. Cl.⁵ ............................................... F16L 33/22
[52] U.S. Cl. ...................................... 285/259; 285/55; 29/506
[58] Field of Search ............... 285/259, 256, 249, 255, 285/174, 246, 247; 29/506

[56] References Cited

U.S. PATENT DOCUMENTS

| | | | |
|---|---|---|---|
| 1,130,473 | 3/1915 | Brown | 285/259 X |
| 1,980,389 | 11/1934 | Dennie | 285/246 |
| 1,987,100 | 1/1935 | Dick | 285/174 X |
| 2,024,507 | 12/1935 | Brunner | 285/259 X |
| 2,152,975 | 4/1939 | Sunford | 285/259 X |
| 3,971,577 | 7/1976 | Schemith . | |
| 4,021,062 | 3/1977 | Mariaulle . | |
| 4,606,783 | 8/1986 | Guest . | |
| 4,666,193 | 5/1987 | Hockett . | |
| 4,738,475 | 4/1988 | Ebert | 285/174 |
| 4,775,172 | 10/1988 | Sauer . | |
| 4,900,068 | 2/1990 | Law | 285/249 X |

FOREIGN PATENT DOCUMENTS

| | | | |
|---|---|---|---|
| 506723 | 3/1976 | U.S.S.R. | 285/246 |
| 1520292 | 11/1989 | U.S.S.R. | 285/249 |

Primary Examiner—Dave W. Arola

[57] ABSTRACT

A hose coupling, and method of constructing same, for sealably interconnecting a flexible hose and a rigid center pipe. The hose coupling is assembled without requiring relative rotation between the rigid center pipe and the inner surface of the flexible hose. The method includes the steps of inserting an end of the center pipe rectilinearly into the opening of the flexible hose, disposing a compression sleeve member having first and second outwardly facing frustoconical surfaces about the flexible hose, disposing first and second complementary threaded tubular members, which respectively define first and second outwardly facing frustoconical surfaces, about the flexible hose and rigid center pipe, respectively, and threadably drawing the first and second complementary threaded tubular members together such that the first and second outwardly inwardly facing frustoconical surfaces respectively force the first and second outwardly facing frustoconical surfaces inwardly to compress the compression member tightly about the flexible hose and the center pipe. The hose coupling includes the compression sleeve member, the first and second complementary threaded tubular members, and the cooperative frustoconical surfaces which force the compression sleeve member to a smaller stressed diameter which securely and sealably interconnects the rigid pipe member and flexible hose.

6 Claims, 1 Drawing Sheet

5,322,331

HOSE COUPLING AND METHOD OF CONSTRUCTING SAME

TECHNICAL FIELD

The invention relates in general to a hose coupling, and a method of constructing same, for sealably interconnecting a rigid pipe member and a resilient hose member.

BACKGROUND ART

Flexible hoses have been developed for the refrigeration and air conditioning industry which have an inner liner designed to inhibit permeation of refrigerant through the hose wall. Such hoses, such as Aeroquip's FC505 hose, reduce liberation of chlorofluorocarbon (CFC) refrigerants to the atmosphere, thought to be harmful to the earth's ozone layer. The inner liner, for example, may include a thin layer of a polyamide polymer, such as a polyamide from the nylon family.

It is common in the refrigeration industry to utilize a hose fitting or hose coupling which sealingly interconnects a rigid center pipe and a flexible hose, including the insertion of the rigid center pipe into the hose opening. This interconnection often requires relative rotation between the rigid center pipe and flexible hose as the rigid center pipe is forced to the desired dimension within the hose opening. Such relative rotation, however, can damage the inner liner of the aforesaid refrigeration hoses, defeating the purpose of such hoses.

Thus, it is desirable, and it is an object of the present invention, to provide a new and improved hose coupling, and method of constructing same, which will provide a reliable sealed joint between a rigid center pipe and a flexible hose, without causing damage to hoses of the type which include an inner liner.

It would also be desirable, and it is another object of the present invention, to provide a new and improved hose coupling, and method of constructing same, which, in addition to preventing damage to hoses having an inner liner, permit disassembly and re-use of the components used in the hose coupling.

SUMMARY OF THE INVENTION

Briefly, the invention includes a method of sealably interconnecting a rigid center pipe and a flexible hose, with the rigid center pipe having a first end, and with the flexible hose having an inner surface which defines an opening which starts at a first end of the flexible hose. The method includes the steps of inserting the first end of the rigid center pipe rectilinearly into the opening at the first end of the flexible hose, and dimensioning the rigid center pipe such that the rigid center pipe enters the flexible hose without damaging the inner surface of the flexible hose. The method further includes providing a compression sleeve member having first and second axial ends, a central axis which extends between the first and second ends, and first and second outwardly facing frustoconical surfaces which respectively start at the first and second axial ends and taper away from the central axis, and disposing the compression sleeve member about a portion of the flexible hose which surrounds the rigid center pipe. The method further includes the steps of providing first and second tubular members having complementary threaded portions, with the first and second tubular members respectively defining first and second inwardly facing frustoconical surfaces, and disposing the first and second tubular members about the flexible hose and rigid center pipe, respectively, such that the first and second inwardly facing frustoconical inner surfaces respectively taper in the same directions as the first and second outwardly facing frustoconical surfaces of the compression sleeve member. The method then includes the steps of engaging the complementary threaded portions of the first and second tubular members such that threadable engagement initiates contact between the first inwardly facing frustoconical surface and the first outwardly facing frustoconical surface, and between the second inwardly facing frustoconical surface and the second outwardly facing frustoconical surface, and drawing the first and second tubular members together by progressive threadable engagement of the complementary threaded portions of the first and second tubular members such that the first and second inwardly facing frustoconical surfaces respectively force the first and second outwardly facing frustoconical surfaces inwardly, to compress the compression sleeve member tightly about the flexible hose and the rigid center pipe.

The invention further includes a hose coupling for sealably interconnecting a flexible hose and a rigid center pipe. The flexible hose includes a first end, an external surface, and an internal surface which defines an opening which starts at a first end of the flexible hose The rigid center pipe includes a first end disposed within the opening of the flexible hose, with the rigid center pipe being dimensioned such that insertion of the rigid center pipe into the opening of the flexible hose will provide a close fit without damage to the internal surface of the flexible hose. The hose coupling includes a compression sleeve member disposed about the flexible hose and a portion of the rigid center pipe disposed therein. The compression sleeve member has first and second axial ends, an inner surface defining an unstressed first diameter selected to enable the compression sleeve member to be selectively positioned on the flexible hose, a substantially C-shaped cross-sectional configuration which enables the compression sleeve member to be forcibly compressed to a smaller second diameter, and an outer surface which includes first and second outwardly facing frustoconical surfaces which respectively start with a first diameter adjacent to the first and second axial ends and taper outwardly to a second and larger diameter intermediate the first and second axial ends. The hose coupling further includes first and second tubular members each having first and second axial ends. The first tubular member has a threaded outer surface which extends inwardly from the second axial end, and an inner surface dimensioned to enable the first tubular body member to be selectively positioned on the flexible hose. The inner surface of the first tubular member defines a cylindrical first portion which starts at the first axial end with a first diameter, and an inwardly facing frustoconical second portion which starts with a larger second diameter adjacent to the second axial end, and which tapers inwardly towards the cylindrical first portion. The second tubular member has an inner surface dimensioned to enable the second tubular member to be selectively positioned on the rigid center pipe. The inner surface of the second tubular member defines a cylindrical first portion which has internal threads complementary to the external threads of the first tubular member, and an inwardly facing frustoconical second portion which starts adjacent to the cylindrical first portion and tapers inwardly towards the second axial end. The first and second tubular members are threadably coupled about the compression sleeve member such that the inwardly facing frustoconical surfaces of the first and second tubular members respectively engage the first and second outwardly facing frustoconical surfaces of the compression sleeve member and force the compression sleeve member to the stressed smaller second diameter, to compress the flexible hose tightly about a portion of the rigid center pipe which is disposed within the opening of the flexible hose and provide a sealed interconnection between the flexible hose and the rigid center pipe.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
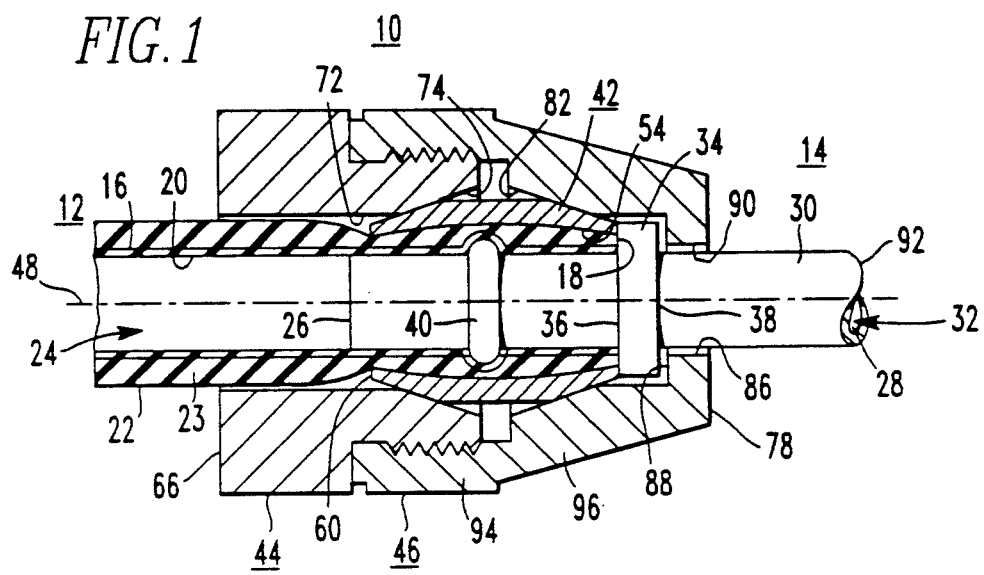
FIG. 1 is a cross sectional view of a hose coupling constructed according to the teachings of the invention.
Figure 2:
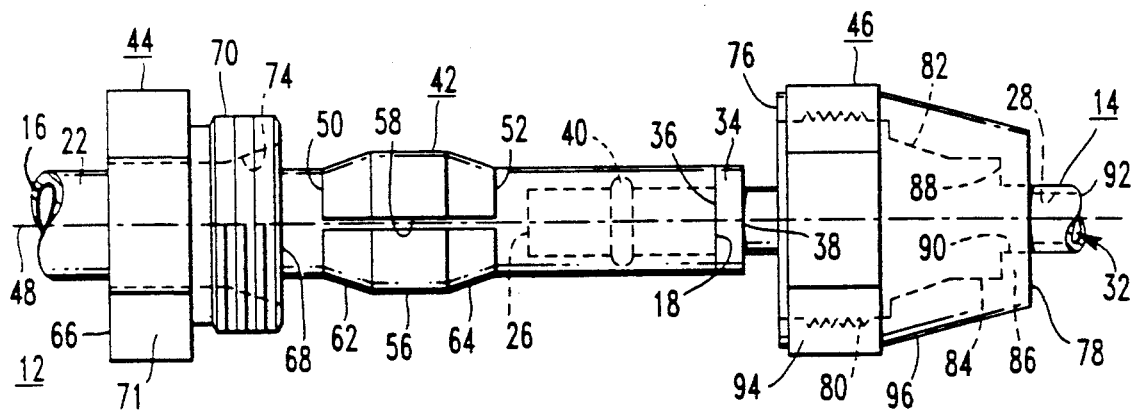
FIG. 2 is an elevational view of the components of the hose coupling shown in FIG. 1 during a method step of the invention.

Referring now to the drawings, FIG. 1 illustrates a cross sectional view of a hose fitting or coupling 10 constructed according to the teachings of the invention, and FIG. 2 is a partially exploded view of the hose coupling 10, which more clearly illustrates the components of hose coupling 10 during a method step in the assembly of hose coupling 10. Both FIGS. 1 and 2 will be referred to during the following description of the invention.

Hose coupling 10 sealingly joins a resilient flexible hose 12, such as a freon or refrigerant hose used in the refrigerant and air conditioning industry, with a rigid, preferably metallic, center pipe 14. Flexible hose 10 is preferably of the type which has an internal membrane or liner 16, although hose coupling 10 is suitable for use with either lined or unlined flexible hoses.

Flexible hose 12 has a first end 18 and inner and outer surfaces 20 and 22, respectively, with the inner surface 20 defining a longitudinally extending center opening 24 having a predetermined diameter. The inner and outer surfaces 20 and 22 thus define a resilient, deformable wall portion 23 therebetween.

Rigid center pipe 14 has a first end 26, and inner and outer surfaces 28 and 30, respectively, with the inner surface 28 defining a longitudinally extending center opening 32 having a predetermined diameter. Rigid center pipe 14 further includes an outwardly extending radial shoulder 34 having first and second axial ends 36 and 38, respectively. The first axial end 36 is spaced from the first end 26 of rigid center pipe 14 by a dimension selected to determine the desired extension of rigid center pipe 14 into the opening 24 of flexible hose 12.

Rigid center pipe 14 further preferably includes friction enhancing means disposed between the first end 26 of the rigid center pipe and the first axial end 36 of radial shoulder 34. While the friction enhancing means may include a knurling of the outer surface 30 between the first end 26 and the first axial end 36 of radial shoulder 34, the friction enhancing means is preferably in the form of an outwardly extending annular bead 40, as illustrated in the Figures. Annular bead 40 is preferably disposed approximately midway between the first end 26 and the first axial end 36 of radial shoulder 34.

For purposes of example, hose coupling 10 may interconnect a refrigerant compressor with a refrigerant condenser in a refrigeration or air conditioning application, with rigid center pipe 14 being connected to a discharge port of the compressor and with flexible hose 12 being connected to an input header of a condenser, but it is to be understood that coupling 10 is suitable for sealably joining any flexible hose 12 and rigid center pipe 14 in any application thereof.

In addition to the flexible hose 12 and rigid center pipe 14, hose coupling 10 requires only three additional components, a compression sleeve member 42 and first and second complementary threaded tubular members 44 and 46. Compression sleeve member 42 and the first and second tubular members 44 and 46 are preferably metallic, such as plated steel, brass, or stainless steel.

Compression sleeve member 42, which also may be called a "crush sleeve" or "crush ring", is a tubular member having a central axis 48, first and second axial ends 50 and 52, and inner and outer surfaces 54 and 56, respectively. Compression sleeve member 42 includes a longitudinally extending gap 58 in its wall which extends between the first and second axial ends 50 and 52. Thus, compression sleeve member has a substantially C-shaped cross sectional configuration when viewing a cross section taken on a plane which is perpendicular to the longitudinally extending center axis 48. The dimension of gap 58 is selected to limit the amount of compressive forces which may be applied to flexible hose 12 and the portion of rigid center pipe 14 disposed within the opening 24 of flexible hose 12, to prevent crushing and thus constricting rigid center pipe 14.

The inner surface 54 of compression sleeve member 42 defines a longitudinally extending opening 60 which may define a constant diameter, especially when the friction enhancing means is in the form of a knurled surface; or, as illustrated in FIG. 1, opening 60 may have a predetermined minimum diameter at the first and second axial ends 50 and 52 of compression sleeve member 42, with the inner wall 54 then curving slightly outward, which configuration is especially suitable when the friction enhancing means includes annular bead 40, to generate more uniform compressive forces on the annular bead 40 and the adjacent straight portions of the outer surface 30 of rigid center pipe 14. The unstressed minimum dimension of the inner diameter of compression sleeve member 42 is selected to enable compression sleeve member 42 to be telescoped over the first end 18 of flexible hose 12 and selectively positioned thereon.

The outer surface 56 of compressive sleeve member 42 includes first and second outwardly facing frustoconical surfaces 62 and 64 which respectively start adjacent to the first and second axial ends 50 and 52 of compression sleeve member 42 and they taper outwardly, away from the center axis 48, as the first and second outwardly facing frustoconical surfaces 62 and 64 extend toward the longitudinal midpoint of the compression sleeve member 42.

The first complementary tubular member 44 has a longitudinal center axis which coincides with center axis 48 when assembled in the hose coupling 10, with center axis 48 extending between first and second axial ends 66 and 68, respectively. Tubular member 44 includes a threaded outer surface 70 which starts adjacent to the second axial end 68 and extends for a predetermined dimension towards the first axial end 66. The remaining outer surface 71 between the threaded outer surface 70 and the first axial end 66 has a configuration which enables tubular member 44 to be held, or rotated, by a suitable tool.

The first complementary threaded tubular member 44 has an inner surface which extends between the first and second axial ends 66 and 68, which inner surface includes a cylindrical first portion 72 which starts adjacent to the first axial end 66 with a first diameter, and it extends towards the second axial end for a predetermined dimension. The inner surface then flares outwardly to define an inwardly facing frustoconical second portion or surface 74 which then extends to a point adjacent to the second axial end 68 of the first tubular member 44. The first inner diameter is selected to enable tubular member 44 to be telescoped over the first end 18 of flexible hose 12 and adjustably positioned thereon.

The second complementary threaded tubular member 46 has a longitudinal center axis which coincides with center axis 48 when assembled in the hose coupling 10, with center axis 48 extending between first and second axial ends 76 and 78, respectively. Tubular member 46 includes a threaded, cylindrical inner surface 80 which starts adjacent to the first axial end 76 and extends for a predetermined dimension towards the second axial end 78. The threads of the internal threaded portion 80 are complementary to the threads of the external threaded portion 70 of the first tubular member 44. The inner surface of the second tubular member 46 then steps inwardly to the start of an inwardly facing frustoconical portion 82 which tapers inwardly as the frustoconical portion 82 extends towards the second axial end 78.

The inner surface of the second tubular member 46 then defines a cylindrical portion 84 which proceeds towards the second axial end 78 for a predetermined dimension, at which point the inner surface of the second tubular member 46 steps inwardly to create a flange 86 having a flange surface 88. The inner surface then continues with a cylindrical surface 90 to the second axial end 78. The diameter defined by cylindrical surface 90 is selected to enable the second tubular member 46 to be telescoped over the second end 92 of the rigid center pipe and adjustably positioned thereon. The inner diameter of cylindrical surface 90 also provides a flange surface 88 which is large enough to contact the second axial end 38 of radial shoulder 34, to limit the movement of the second tubular member 46 towards the first end 26 of the rigid center pipe 14. If the second end 92 is to be provided With a flare nut, for example, such as for connection to a refrigerant compressor, then the second tubular member 46 is positioned on rigid center pipe 14 before the flare nut is attached.

The second complementary threaded tubular member 46 has an outer surface which extends between the first and second axial ends 76 and 78, including a first outer surface portion 94 which starts at the first axial end 76 and extends towards the second axial end 78 for a predetermined dimension, with the first outer surface portion 94 being configured to enable the second tubular member 46 to be held, or rotated, by a suitable tool. The remaining outer surface 96 from the end of the first outer surface portion 94 to the second axial end 78, may have any suitable configuration.

In the assembly of the components to form hose coupling 10, the first tubular member 44 is telescoped over the first end 18 of flexible hose 12 such that the second axial end 68 of the first tubular member 44 is closer to the first end 18 of the flexible hose 12 than the first axial end 66. In like manner, the compression sleeve member 42 is telescoped over the first end 18 of flexible hose 12 such that the second axial end 52 of the compression sleeve member 42 is closer to the first end 18 of the flexible hose 12 than the first axial end 50. The frustoconical surfaces 62 and 74 of the compression sleeve member and of the first tubular member 44 will thus taper in the same direction.

The second tubular member 46 is telescoped over the second end 92 of the rigid center pipe 14 such that the first axial end 76 of the second tubular member 46 is closer to the first end 26 of the rigid center pipe 14 than the second axial end 78. Thus, when the rigid center pipe 14 is assembled with flexible hose 12, the frustoconical surfaces 64 and 82 of the compression sleeve member 42 and of the second tubular member 46 will taper in the same direction.

The first end 26 of the rigid center pipe 14 is then inserted into opening 24 at the first end 18 of flexible hose 12, with care being taken to utilize a rectilinear movement, rather than a twisting movement. The rigid center pipe 14 and annular bead 40 are dimensioned to enable a rectilinear movement to be used, providing as close fit as possible while obviating the need to provide relative twisting between the rigid center pipe 14 and flexible hose 12 to enable rigid center pipe 14 to be inserted for the desired insertion dimension, i.e., until the first end 18 of the flexible hose 12 contacts the first axial end 36 of radial shoulder 34. When the relative dimensions between the rigid center pipe 14 and the diameter of opening 24 in flexible hose 12 are such that the desired insertion dimension can only be achieved by relative twisting action between the components, an inner liner or membrane in flexible hose 12, such as liner 16, may be damaged, destroying the effectiveness of liner 16 in preventing permeation of chemicals through the wall of flexible hose 12.

The compression sleeve member 42 is then positioned on flexible hose 12 such that the second axial end 52 thereof is immediately adjacent to the first axial end 36 of radial shoulder 34. The outer diameter of radial shoulder 34 may be slightly larger than the diameter of the opening in compression sleeve member 42, enabling the second axial end 52 of the compression sleeve member 42 to be butted against the first axial end 36 of radial shoulder 34. This positioning of compression sleeve member 42 automatically centers the compression sleeve member 42 over the portion of rigid center pipe 14 which extends into flexible hose 12, including the centering of the compression sleeve member 42 relative to the annular bead 40, when an annular bead is used as the friction enhancing means.

The first tubular member 44 is then moved to the right in the view of FIG. 2, until the inwardly facing frustoconical surface 74 contacts the outwardly facing frustoconical surface 62 of compression sleeve member 42.

The radial flange 34 thus provides the function of ensuring proper alignment of the various components of hose coupling 10, locating the first end 18 of the flexible hose 12 and the second axial end 52 of the compression sleeve member 42 against the first axial end 36, and locating the inwardly facing frustoconical surface 74 of the first tubular member 44 against the outwardly facing frustoconical surface 62 of compression sleeve member 42.

The second tubular member 46 is then moved toward the first end 26 of the rigid center pipe 14 until the first axial end 76 thereof contacts the second axial end 68 of the first tubular member. The first and second tubular members 44 and 46 are then threadably engaged, preferably by holding the first tubular member 44 and rotating the second tubular member 46. As the first and second tubular members 44 and 46 are drawn together by progressive threadable engagement, the inwardly facing frustoconical surfaces 74 and 82 of the first and second tubular members 44 and 46 respectively contact and ride up the outwardly facing frustoconical surfaces 62 and 64 of the compression sleeve member 42, forcing the compression sleeve member 42 to a smaller stressed inner diameter which results in tightly compressing and inwardly deforming the resilient wall portion 23 of the flexible hose 12 about the portion of rigid center pipe 14 which is surrounded by compression sleeve member 42. When the gap 58 is closed, the desired holding and sealing pressure is obtained, and no further pressure can be applied to the portion of the rigid center pipe 14 disposed within the opening 24 of the flexible hose 12.

In summary, a hose coupling 10 has been formed according to the teachings of the invention, which includes a method of assembling hose coupling 10, without requiring relative twisting between the rigid center pipe 14 and the inner surface 20 of the flexible hose 12. Thus, hose coupling 10 may be used to couple a rigid center pipe 14 and a flexible hose 12 having an inner liner or membrane 16, without danger of rupturing or otherwise damaging the inner liner 16. Further, simply threadably disengaging the first and second tubular members 44 and 46 and separating them enables the compression sleeve member 42 to return to its unstressed configuration. These components may then be used to construct another hose coupling 10.

We claim:

1. A method of sealably interconnecting first and second conduits for sealed fluid flow therebetween, with the first and second conduits respectively including a rigid center pipe and a flexible hose, with the rigid center pipe having a first end and an outwardly extending radial shoulder spaced from the first end, with the radial shoulder having first and second axial ends, and with the flexible hose having an inner surface which defines an opening which starts at a first end of the flexible hose, comprising the steps of:

inserting the first end of the rigid center pipe rectilinearly into the opening at the first end of the flexible hose, positioning the first end of the flexible hose immediately adjacent to the first axial end of the radial shoulder, dimensioning the rigid center pipe such that the center pipe enters the flexible hose without damaging the inner surface of the flexible hose, providing a compression sleeve member having first and second axial ends, a gap which extends uninterrupted between the first and second ends, a central axis which extends between the first and second axial ends, and first and second outwardly facing frustoconical surfaces which respectively start adjacent to the first and second axial ends and taper away from the central axis, disposing the compression sleeve member about a portion of the flexible hose which surrounds the rigid center pipe, positioning the compression sleeve member with the second axial end thereof immediately adjacent to the first axial end of the radial shoulder on the rigid center pipe, providing first and second tubular members having complementary threaded portions, with the first tubular member having an inner surface which defines a first inwardly facing frustoconical surface, and with the second tubular member having an inner surface which defines a second inwardly facing frustoconical surface and an inwardly facing flange, disposing the first and second tubular members about the flexible hose and rigid center pipe, respectively, such that the first and second inwardly facing frustoconical surfaces respectively taper in the same directions as the first and second outwardly facing frustoconical surfaces of the compression sleeve member, engaging the complementary threaded portions of the first and second tubular members such that predetermined threadable engagement initiates contact between the first inwardly facing frustoconical surface and the first outwardly facing frustoconical surface, and between the second inwardly facing frustoconical surface and the second outwardly facing frustoconical surface, drawing the first and second tubular members together by progressive threadable engagement of the complementary threaded portions such that the first and second inwardly facing frustoconical surfaces respectively force the first and second outwardly facing frustoconical surfaces inwardly, to compress the compression sleeve member until the gap in the compression sleeve member is closed, to firmly grip the flexible hose while limiting compressive forces applied the rigid center pipe, and dimensioning the flange of the second tubular member such that the flange of the second tubular member cannot move past the second axial end of the radial shoulder during the step of drawing the first and second tubular members together.

2. The method of claim 1 including the step of providing friction enhancing means on the rigid center pipe adjacent to the first end of the rigid center pipe, and wherein the step of inserting the first end of the rigid center pipe into the flexible hose disposes the friction enhancing means within the opening of the flexible hose, the step of dimensioning the center pipe prevents the friction enhancing means from damaging the internal surface of the flexible hose, and the step of disposing the compression sleeve member about the flexible hose includes the step of locating the compression sleeve member about the friction enhancing means.

3. The method of claim 1 including the step of providing an outwardly extending annular bead on the rigid center pipe, spaced from the first end of the center pipe, and wherein the step of inserting the first end of the center pipe into the flexible hose disposes the annular bead within the opening of the flexible hose, the step of dimensioning the rigid center pipe prevents the annular bead from damaging the internal surface of the flexible hose, and the step of disposing the compression sleeve member about the flexible hose includes the step of locating the compression member about the annular bead.

4. A hose coupling for sealably interconnecting first and second conduits for sealed fluid flow therebetween, with the first and second conduits respectively including a flexible hose and a rigid center pipe, with the flexible hose having a first end, an external surface, and an internal surface which defines an opening which starts at the first end of the flexible hose, and with the rigid center pipe having a first end and an outwardly extending radial shoulder spaced from the first end, with the radial shoulder having first and second axial ends, the first end of said rigid center pipe being disposed within the opening of the flexible hose with the first end of the flexible hose disposed immediately adjacent to the first axial end of the radial shoulder of the rigid center pipe, said rigid center pipe being dimensioned such that insertion of the center pipe within the opening of the flexible hose provides a close fit without damage to the internal surface of the flexible hose, a compression sleeve member disposed about the flexible hose and a portion of the rigid center pipe which is disposed therein, said compression sleeve member having first and second axial ends, an inner surface defining an unstressed first diameter selected to enable the compression sleeve member to be selectively positioned on the flexible hose, and a substantially C-shaped cross-sectional configuration which defines a continuous longitudinally extending gap which extends between the first and second ends of the compression sleeve member, with the gap enabling the compression sleeve member to be forcibly compressed to a smaller second diameter, said compression sleeve member having an outer surface which includes first and second outwardly facing frustoconical surfaces which respectively start with a first diameter adjacent to the first and second axial ends and taper outwardly to a second and larger diameter intermediate the first and second axial ends, said compression sleeve member being positioned on the flexible hose with the second axial end immediately adjacent to the first axial end of the radial shoulder on the rigid center pipe, first and second tubular members each having first and second axial ends and complementary threaded portions, said first tubular member having an inner surface dimensioned to enable the first tubular body member to be selectively positioned on the flexible hose, said inner surface of the first tubular member defining a cylindrical first portion which starts at the first axial end with a first diameter, and an inwardly facing frustoconical second portion which starts with a larger second diameter adjacent to the second axial end, and which tapers inwardly towards the cylindrical first portion, said second tubular member having an inner surface dimensioned to enable the second tubular member to be selectively positioned on the rigid center pipe, and a flange which extends inwardly towards the rigid center pipe, said inner surface of said second tubular member further defining an inwardly facing frustoconical portion which starts intermediate the first and second axial ends and tapers inwardly towards the second axial end, said first and second tubular members being threadably coupled about the compression sleeve member such that the inwardly facing frustoconical surfaces of the first and second tubular members respectively engage the first and second outwardly facing frustoconical surfaces of the compression sleeve member while the flange on the second tube member prevents movement of the flange past the second axial end of the radial shoulder, to force the compression sleeve member to close the longitudinal gap which extends between the first and second ends and compress the flexible hose tightly about a portion of the rigid center pipe which is disposed within the opening of the flexible hose while limiting stresses applied to the rigid center pipe, to provide a sealed fluid flow interconnection between the flexible hose and rigid center pipe.

5. The hose coupling of claim 4 including friction enhancing means on the rigid center pipe adjacent to the first end of the rigid center pipe, with the friction enhancing means being disposed within the opening of the flexible hose, the center pipe and friction enhancing means being dimensioned to prevent the friction enhancing means from damaging the internal surface of the flexible hose, and the compression sleeve member being disposed about the flexible hose to locate the compression sleeve member about the friction enhancing means.

6. The hose coupling of claim 4 including an outwardly extending annular bead on the rigid center pipe, spaced from the first end of the rigid center pipe, with the annular bead being disposed within the opening of the flexible hose, the center pipe and annular bead being dimensioned to prevent the annular bead from damaging the internal surface of the flexible hose, and with the compression sleeve member being located about the flexible hose and the portion of the rigid center pipe which includes the annular bead.

* * * * *